Oct. 30, 1934.  J. S. SHARPE  1,978,439
VARIABLE TRANSMISSION
Original Filed April 1, 1930   3 Sheets—Sheet 2

Inventor
John S. Sharpe
by his Attorney
Howson & Howson

Oct. 30, 1934.    J. S. SHARPE    1,978,439
VARIABLE TRANSMISSION
Original Filed April 1, 1930    3 Sheets—Sheet 3
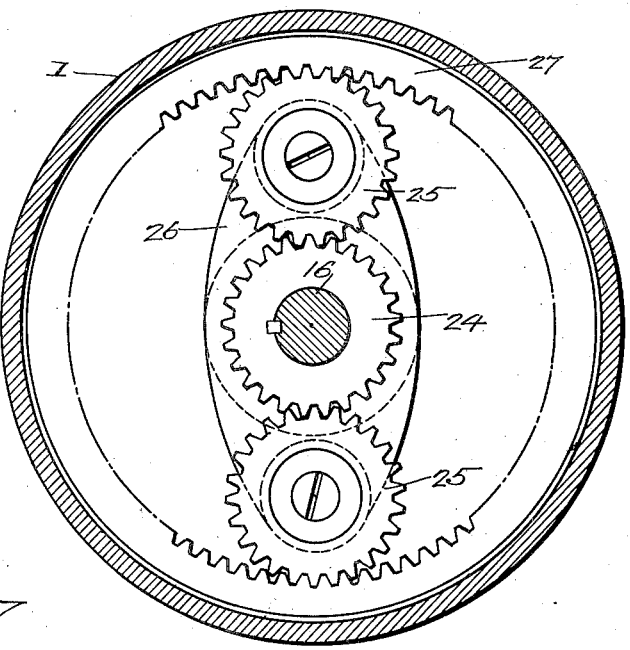
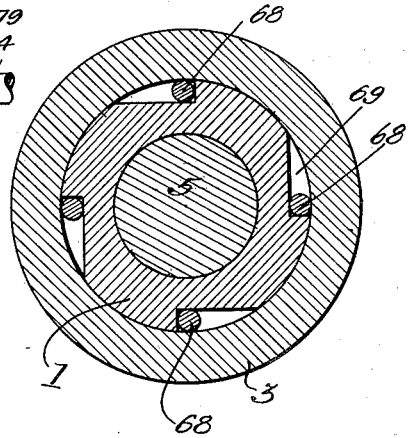
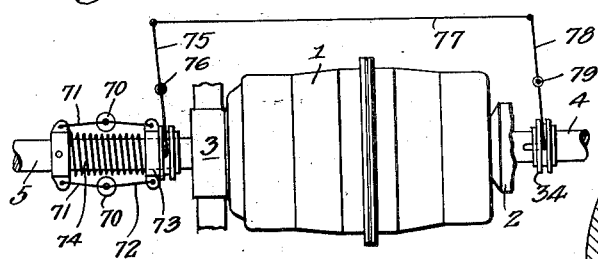
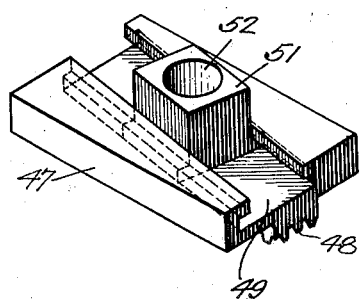
Inventor:
John S. Sharpe
by his Attorneys.
Howson & Howson Patented Oct. 30, 1934

1,978,439

UNITED STATES PATENT OFFICE 1,978,439

VARIABLE TRANSMISSION

John S. Sharpe, Haverford, Pa.

Application April 1, 1930, Serial No. 440,755
Renewed June 9, 1933

46 Claims. (Cl. 74—34)

This invention relates to improvements in transmission mechanisms, and more particularly to improvements in the general type of mechanism disclosed in my copending application Serial Number 325,157.

One of the objects of the present invention is to provide a generally improved transmission mechanism capable of efficient operation in the transmission of relatively high powers and including readily operable means for varying the ratio of the velocities of the driving and driven parts and of the torque input and output with a minimum of power losses and without disconnecting the said parts from the power source.

Another object of the invention is to provide a mechanism of the stated character affording a variation in speed and torque ratios between driving and driven shafts continuously progressive between any two points within a range extending between a desirable maximum and a direct drive relation between the said shafts.

Another object of the invention is to provide a mechanism of the stated character in which movement of readily adjustable elements effects a continuously progressive change in the velocity and torque ratios of the driving and driven parts over any portion of a range extending between a maximum and a direct drive relation between said parts, and vice versa.

Still another object of the invention is to provide a mechanism of the stated character which shall be readily adapted to automatic control as hereinafter more fully set forth.

A still further object of the invention is to provide a mechanism of the type set forth which shall be characterized by a desirable compactness of form.

The invention further resides in certain mechanical details and combinations hereinafter set forth and illustrated in the attached drawings, in which:

Figs. 3 and 4 are fragmentary detached views in perspective of elements of the control mechanism;

Fig. 5 is a section on the line 5—5, Fig. 1;

Fig. 6 is a section on the line 6—6, Fig. 1, and

Fig. 7 is a diagrammatic view of the transmission illustrating application thereto of automatic control.

Figure 1:
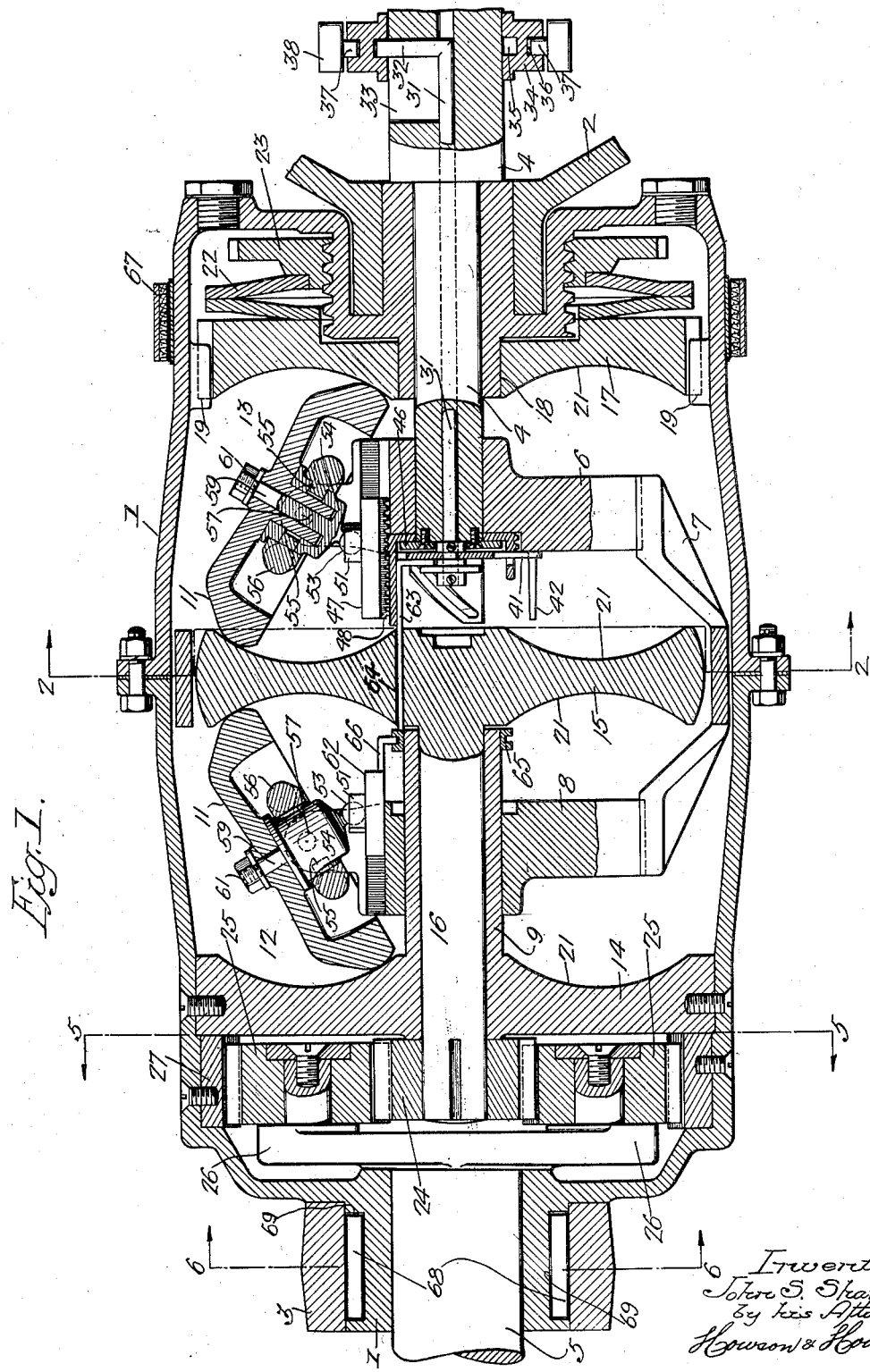
Figure 1 is a horizontal sectional view of a mechanism made in accordance with my invention.

With reference to the drawings, 1 is a housing journaled at one end in a bearing 2 and at the opposite end in a bearing 3, the journal portions of the housing themselves constituting bearings for shafts 4 and 5 which respectively may be considered the driving and driven shafts of the mechanism. The shaft 4 has attached to its inner end a spider 6 which constitutes one side of a yoke structure 7, the other side of which is constituted by a similar spider 8 journaled on a sleeve on the housing 1.

Adjustably mounted on each of the spiders 6 and 8 are three (in the present instance) traction wheels 11, these being adapted to operate within substantially toroidal spaces 12 and 13 formed respectively between the faces of a plate 14 secured to the housing (of which the sleeve 9 is an integral part); a rotary disk 15 carried by a jack shaft 16 journaled in the member 14 and the sleeve 9; and a second disk 17 slidably mounted at 18 on the housing 1 and prevented from rotating with respect to the housing by means of interlocking projections 19 at the periphery of the disk 17 and on the housing. As clearly illustrated, the inner faces of the members 14 and 17 and both sides of the member 15 are provided with annular recesses 21 concentric with the shafts 4 and 16, which recesses form the opposite sides of the aforesaid toroidal spaces 12 and 13. The traction wheels 11 are maintained continuously in peripheral contact with the members 14, 15 and 17 by means of a spring 22 which engages the outer face of the slidable member 17 and is confined by an adjusting nut 23 in the housing by means of which nut the tension of the spring 22 and the compressive force applied to the wheels 11 between the members 14, 15 and 17 may be regulated as required.

To the outer end of the jack shaft 16 is secured a pinion 24 which meshes with a pair of planetary pinions 25, each rotatably carried upon an arm 26 on the inner end of the shaft 5. The planetary pinions 25 mesh with an internal annular gear 27 secured to the housing 1. Assuming for the moment that the housing 1 is fixed, motion may be transmitted from the shaft 4 to the shaft 5 through the medium of the planetary traction wheels 11 which react with the casing members 14 and 17 and upon the member 15 to effect a rotation of the shaft 16 and, through the planetary gearing 24—25—27, of the shaft 5.

It will also be apparent that the angular position of the wheels 11 and their points of contact with the members 14, 15 and 17 will effect the speed and torque ratios between the shafts 4 and 5, and means is provided for adjusting the said wheels 11 to vary the said ratios.

Figure 3:
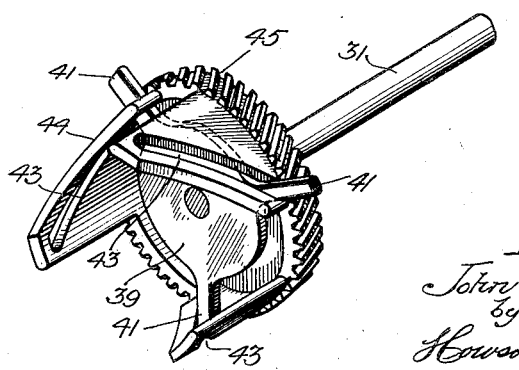

As illustrated in Fig. 1, the shaft 4 is provided with an axial bore in which is slidably mounted a rod 31, this rod terminating at its outer end in a transverse extension 32 which occupies a longitudinal slot 33 in the shaft 4. Slidably mounted on the shaft 4 in this slotted portion is a collar 34 having an internal circumferential recess 35 which receives the projecting end 32 of the rod 31, and the collar 34 also has in its outer face a circumferential recess 36 for reception of the pins 37 of a shifting fork 38 whereby the rod 31 may be shifted longitudinally within the shaft 4. The inner end of the rod 31 carries a disk 39 having radially projecting arms 41, see Fig. 3, the outer ends of which are positioned within axially slotted guides 42 projecting from the inner face of the spider 6. Rotation of the rod 31 with respect to the shaft 4 and the spider 6 is thus prevented, although axial movement of the rod within the shaft is permitted. The arms 41 of the disk 39 extend also through cam slots 43 in axially projecting arcuate flanges 44 of a spiral gear 45, which gear is rotatably secured on the inner end of the shaft 4 by means of a plate 46 which confines the web of the said gear between itself and the inner face of the spider 6, see Fig. 1. The cam slots 43 being inclined to the axis of the shaft 4, longitudinal movement of the rod 31 within the shaft effects, through the medium of the radial arms 41, a rotary movement of the gear 45.

Figure 2:
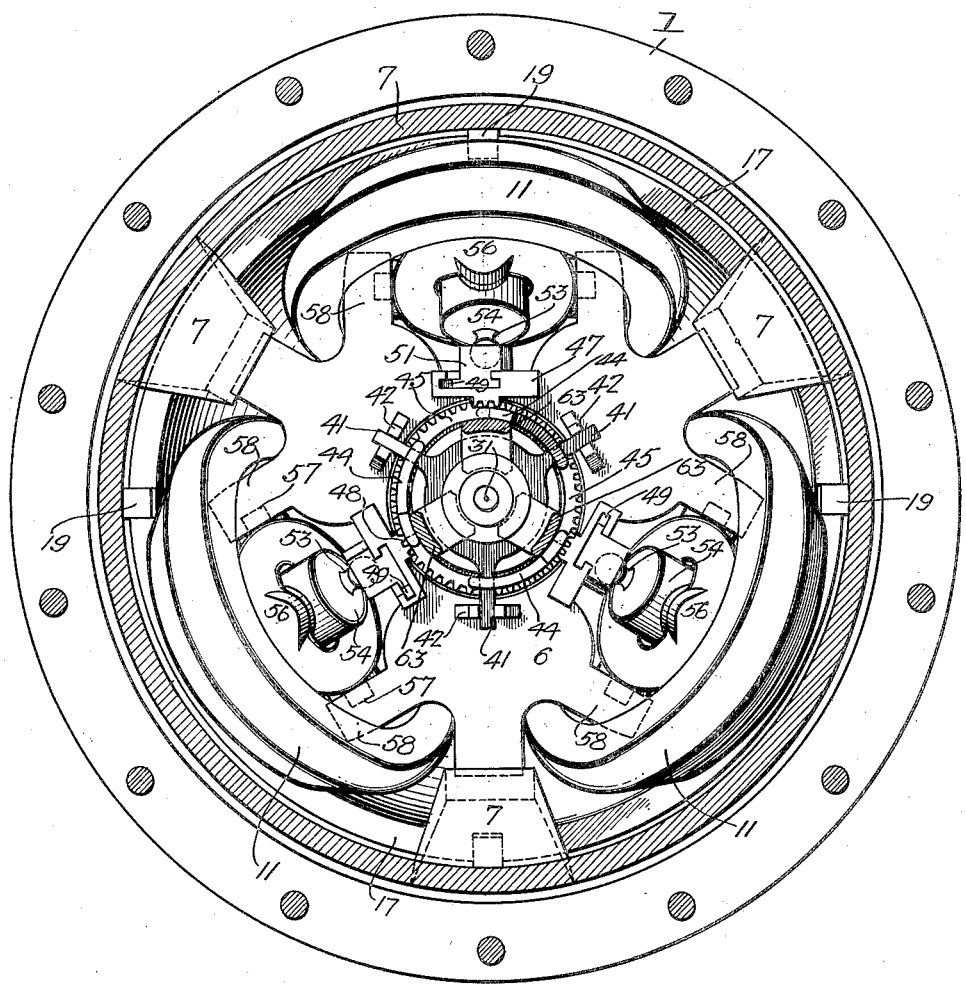
Fig. 2 is a section on the line 2—2, Fig. 1.

Axially slidable in the spider 6, circumferentially of which they are evenly spaced, is a plurality (three in the present instance) of members 47, see Fig. 4, each of these members 47 having on its nether face a rack 48 with which the said gear 45 meshes. Each of the members 47 is provided in its outer face with a diagonal T slot 49 in which is slidably mounted a block 51, each block having a cylindrical recess 52 which constitutes a socket for the reception of a ball 53 projecting from members 54 in which the wheels 11 are respectively journaled. Each of the members 54 is supported on trunnions 55 in an annular support member 56, which in turn is mounted on trunnions 57 in arms 58 of the spider, see Fig. 2, the axes of the trunnions 55 and 57 extending at right angles to each other and thus affording the wheels 11 a substantially universal mounting within the spider 6.

Details of the member 54 are shown in Fig. 1. These members are substantially cup-shaped in form for reception of the hub portion of the wheels 11, and each is provided with a centrally projecting stem 59 which projects through a central aperture in the wheel 11 and is threaded at the outer end for reception of a nut 61 by means of which the wheel is held in the member. Also as shown in Fig. 1, the sides of each of the members 54 are provided with openings for reception of the trunnions 55 of the annular support member 56.

It will be noted that by reason of the angularity of the slot 49 of the members 47, any movement of these members by the means previously set forth will result in a movement of the socket blocks 51 in a direction transverse to the axial direction and a consequent adjustment of the wheel supports 54 and the wheels 11 themselves about the trunnions 55 of the support member 56. This in effect causes a tilting of the wheels 11 upon an axis intersecting the points of contact between the wheels and the members 15 and 17, and this movement as set forth in my aforesaid copending application Serial Number 325,157 results automatically in a movement of the said wheels about the axes of the trunnions 57. This latter movement of the wheels 11 and of the support members 54 effects a return movement of the socket blocks 51 in the slots 49 toward the normal position from which they were originally shifted by the movement of the members 47, the normal position being reached and the return movement of the socket blocks being terminated when the wheels 11 respectively occupy positions in which their planes of rotation are tangent to circles concentric with the axis of the shaft 4. As previously stated, any movement of the wheels 11 from this normal position on the axis intersecting the points of contact of the wheel with the members 15 and 17 will effect an automatic movement of the wheel about the axis of the trunnions 57, the direction of movement about this latter axis depending on the direction in which the wheels are originally tilted on the trunnions 55 from their normal planes. The tilting of the wheels in the desired direction about these latter trunnions is accomplished, as will be understood from the foregoing description, through the medium of the rod 31.

The wheels 11 of the spider 8 are reversely inclined so that the reaction of both sets of wheels 11 upon the member 15 will be the same. Mechanism substantially identical with that described above is provided for tilting the wheels 11, the parts of this mechanism being given in the drawings corresponding reference numerals for purposes of identification. The control mechanism of the wheels of the spider 8, however, differs from that of the wheels 11 of the spider 6, in that the sliding members 62 which correspond with the members 47 previously described are not provided with a rack but are directly connected through rods 63 with the disk 39 and the rod 31. The rods 63 pass through suitable transverse openings 64 in the member 15, and at their outer ends are attached to a circumferentially grooved ring 65 slidable on the sleeve 9.

From the members 62 rods 66 extend outwardly and downwardly into the groove of the ring 65, as illustrated in Fig. 1. With the arrangement described above, longitudinal movement of the rod 31 results in a corresponding movement of the members 62 and adjustment of the wheels 11 of the spider 8 in a manner similar to that previously described in connection with the wheels 11 of the spider 6. The cam slots 43, the gear 45 and the rack 48 are so formed as to afford for any given movement of the rod 31 equal movements of the slide members 47 and 62 in opposite directions whereby the adjustment and all movements of the wheels 11 of the spiders 6 and 8 are synchronized and are identical except as to direction. At all times, however, the points of contact between the wheels 11 of both spiders and the members 14 and 17 are equally distant from the axis of rotation of the aligned shafts 4, 5 and 16, while the said wheels 11 engage the member 15 on directly opposite circular paths concentric with the axis of the shafts.

It will be noted by reference to Fig. 1 that a friction brake 67 is provided for the housing 1, this brake being actuated by means not shown for a purpose hereinafter set forth.

In operation, it may be assumed that the mechanism as described above is applied as a transmission for motor vehicles, the shaft 4 being connected with the source of power and the shaft 5 constituting the propeller shaft. As illustrated in Fig. 1, the parts are in position for starting the vehicle. Let it be assumed that a turning force of one hundred units is applied through the shaft 4 to the wheels 11, this force being exerted at a point on the rotary axis of the wheels and on a line intersecting the points of contact of the wheels with the members 14, 15 and 17. Since the wheels of both spiders act similarly upon the members 14, 15 and 17, the description will be confined to the wheels of the spider 6. A force of one hundred units applied as described above will be resolved into two forces of fifty units each applied to the members 15 and 17 at the points of contact between these members and the wheel 11, these forces tending to rotate both of these members in the same direction.

By reason of the relative remoteness of the point of contact between the wheel 11 and the member 15 from the axis of the shafts as compared with the point of contact between the wheel 11 and the member 17, the turning moment or torque upon the member 15 is materially greater than that upon the member 17, and as a result of this unbalance there is a tendency to rotate the member 15 to the exclusion of the member 17. The turning force applied to the member 15 is transmitted through the pinions 24 to the pinions 25 and is materially increased by reason of the advantageous leverages. The turning force applied to the member 17 is transmitted through the housing 1 and internal gear 27 to the opposite sides of the pinions 25 and is materially decreased by reason of the unfavorable leverages.

Assuming that the motor vehicle is stationary, the inertia of the car tends to maintain the shaft 5 stationary, with the result that the preponderant turning force applied to the pinions 25 through the pinion 24 tends to cause a reverse rotation of the housing 1. This, however, is prevented by a ratcheting device between the journal portion of the housing and the bearing 3, illustrated in Figs. 1 and 6. This ratcheting device consists of a plurality of rollers 68 positioned in recesses in the peripheral face of the journal portion of the housing and forming a well known form of ratcheting mechanism permitting rotation of the housing in the bearing in one direction only. As a consequence of this device, the internal gear 27 is made to constitute a fulcrum about which the pinions 25 may turn with the result that the torque applied to the shaft 5 is of still greater magnitude than that exerted on the pinions 25 by the pinion 24 and should be sufficient to start the motor vehicle in motion. When rotation of the shaft 5 is initiated, it will be apparent that the rollers 11 will track upon the members 14 and 17, and by reason of the positions of the wheels 11 and the gearing 24—25—27, as illustrated in Fig. 1, three will be a material speed reduction between the drive shaft 4 and the driven shaft 5.

On the other hand, the torque transfer ratio will be relatively high. It was assumed that a force of one hundred units was applied through the shaft 4 to the wheels 11, this force being resolved into component forces of fifty units each applied to the members 15 and 17. The lines of contact between the pinion 24 and the pinions 25 being in the present instance one-third of the distance from the axis of rotation of the said member 15 and of the shaft 16 of the points of contact between the wheels 11 and the said member 15, a force of fifty units applied to the member 15 through the wheels 11 as set forth affords a turning force of one hundred and fifty units exerted upon the pinions 25 from the pinion 24. By reason of the immobilization of the internal gear 27, as described above, this turning force is increased to three hundred units applied to the arms 26 of the shaft 5 on the axes of the wheels 25. It will be noted, on the other hand, that the force of fifty units applied through the rollers 11 to the members 14 and 17 is actually decreased in transmission to the pinions 25 by reason of the relatively great distance of the lines of contact between the gear 27 and the said pinions from the axis of said members as compared with the distance from said axis to the point of contact of the said rollers with the members 14 and 17.

As the motor vehicle picks up speed, the wheels 11 may be adjusted as previously described to alter the speed and torque ratios between the driving and driven shafts. In this adjustment, the wheels 11 of the spider 6 are moved about the axis of the trunnions 57 in a counterclockwise direction (Fig. 1), while the wheels 11 of the spider 8 are oppositely moved. As the wheels approach the terminal positions in which their points of contact with the members 15 and 14—17 correspond in radial distance from the axis of the shafts with the lines of contact between the pinions 25 and the pinion 24 and gear 27, respectively, the speed and torque ratios beween the shafts 4 and 5 are progressively decreased and the torques exerted on opposite sides of the respective pinions 25 approach unity, until when the said terminal position is reached, a balance of forces is obtained which causes a relative immobilization of the parts including the shafts and the housing 1 and rotation of the mechanism as a unit in the bearings 2 and 3, there being accomplished in this manner a direct drive connection between the motor and the propeller shaft 5.

Assuming that the same force of one hundred units is applied as previously described to the wheels 11 through the drive shaft 4, the wheels 11 being in the aforesaid terminal position, this force of one hundred units is resolved also as previously set forth into two forces of fifty units each applied respectively to the member 15 and to the housing 1 through the members 14 and 17. In this instance, however, the torque upon the member 15 is relatively small as compared with the torque on the members 14 and 17, so that in the adjustment of the wheels 11 toward the said terminal position, there is an increasing tendency towards rotation of the housing 1 in the same direction as the rotation of the drive shaft. The force of fifty units applied to the member 15 at a distance from the rotary axis thereof corresponding to the distance from said axis of the line of contact between the pinion 24 and the pinions 25 gives a corresponding force of fifty units applied to the said latter pinions; while the corresponding force applied to the members 14 and 17 is transmitted without change to the opposite sides of the pinions 25, this by reason of the corresponding distance from the rotary axis of the shafts of the points at which the forces are applied to the said members through the wheels 11 and to the pinions 25 from the gear 27. A force of one hundred units is thus applied to the arms 26 of the shaft 5 on the axes of the pinions 25 which corresponds exactly to the force originally applied to the wheels 11 from the shaft 4, and both forces are applied to their respective parts at points equidistant from the axis of rotation of the shafts. A balance of forces is thus obtained which effects an interlocking of the entire mechanism and rotation of the housing and shafts as a unit.

The brake 67 is utilized for retarding the motion of the housing 1 when it is desired to shift the mechanism for a higher torque or speed ratios, this brake overcoming a tendency of the housing to continue its rotational movement even after the wheels 11 are tilted as the balance of forces is still effective.

From the foregoing description, it will be apparent that I have provided a variable torque transfer or transmission mechanism which by simple adjustment of the wheels 11 affords a variation in speed and torque ratios between driving and driven shafts which is continuous over a range corresponding to the ranges of the standard gear shift transmissions now commonly employed, the range of variation extending from a desirable maximum to a direct drive connection between the power source and the driven shaft. The device is particularly well adapted for automatic operation by actuating the adjusting rod 31, for example, through the medium of a centrifugal device associated with the driven member whereby the speed of the latter may control the adjusted position of the wheels 11. Such a device is illustrated in Fig. 7, in which the driven shaft 5 is illustrated as having associated therewith a governor of well known type including weights 70 which tend by centrifugal force to move outwardly as the speed of the shaft 5 increases, thereby through arms 71—72 shifting a collar 73 axially of the shaft against the tension of a spring 74. Operatively connected with the collar 73 is a lever 75 pivoted at 76, the outer end of this lever being connected through a rod 77 with a second lever 78 mounted on a fixed pivot 79 and operatively connected at its inner end with the collar 34 to which as previously described is connected the control rod 31. With this arrangement, it will be apparent that the speed of the driven shaft immediately controls the position of the wheels 11 and therethrough the ratio of torques between the driving and driven shafts.

There may be considerable modification of the herein described mechanism without departure from the invention.

I claim:

1. The combination with a driving shaft, of a driven shaft, and an intermediate transmission shaft, a rotary reaction member, transmission means connecting the driving shaft with the intermediate shaft and the intermediate shaft with the driven shaft, both of said transmissions being operative by reaction with the reaction member, means for controlling the movement of the reaction member to render said transmissions effective, that one of said transmissions associated with the driving shaft being of the friction type and being adjustable to vary the torque ratio of the driving and driven shafts.

2. The combination with a rotary driving member, of a rotary driven member and a reaction member, two of said members having oppositely recessed parts defining a toroidal space concentric with the axis of rotation of said members, a rotary element carried by the other of said members and contacting at diametrically opposite points thereof with the recessed members, said rotary element being arranged with its rotary axis intersecting the annular axis of said toroidal space and being movable to very the relative distances of the points of contact with said recessed members with respect to the axis of rotation of the rotary members, and means for adjusting said element on an axis through the points of contact thereof with the recessed members including an actuating element extending concentrically and axially through at least one of said rotary members.

3. The combination with driving and driven members and a movable reaction member, means for restraining the reaction member from movement in one direction, and transmission means connecting the driving and driven members and including elements reactive in opposite directions upon the reaction member, said transmission means being adjustable to vary the torque ratio of the driving and driven members and to simultaneously vary the ratio of the magnitudes of the opposed forces reacting with the reaction member, said reaction forces approaching unity as the torque ratio of the driving and driven members decreases, and means for retarding the movement of the reaction member.

4. The combination with a rotary driving member, of a rotary driven member and a reaction member, said driven and reaction members having oppositely recessed parts defining a toroidal space concentric with the axis of rotation of said members, a rotary element carried by the driving member and contacting at diametrically opposite points thereof with the recessed members, said rotary element being arranged with its rotary axis intersecting the annular axis of said toroidal space and being movable to vary the relative distances of the points of contact with said recessed members with respect to the axis of rotation of the rotary members, and means for adjusting said element on an axis through the points of contact thereof with the recessed members including a member mounted on the driving member for axial movement therein and having a cam slot disposed angularly to said axis, an element mounted in said slot and engaging the said rotary element, a rotary actuator carried by the driving member and having operative connection with the axially movable member whereby the rotation of the one results in axial movement of the other, an actuating rod carried by the driving member and axially movable therein, and means operatively connecting the rod with the said rotary actuator whereby the longitudinal movement of the former effects rotation of the latter.

5. The combination with a planetary driven member, of a pair of concentric rotary elements engaging opposite sides of said member, a planetary driving member operative through said elements to exert equal torques upon the said opposite sides of the driven member whereby said members and elements tend to rotate as a unit in the same direction, means associated with the driving member whereby the torque exerted through one of said elements may be increased, and means for preventing rotation of the other of the elements in a reverse direction.

6. The combination with a planetary driven member, of a pair of concentrically rotatable transmission elements operatively engaging opposite sides of said member, means for applying a load at the axis of said driven member, a planetary driving member also engaged at opposite sides by said transmission elements, said elements being movable together in one direction only under impulse of said driving member, means for adjusting said planetary driving members to relatively vary the moments of force between the member and the said elements whereby the relative torque transferred between the other of said members and the elements may vary from a substantial equality to a predetermined inequality, and means for preventing a reverse movement of that one of the power-transmitting elements transmitting the lesser torque whereby said element may constitute a fulcrum about which the driven member is movable under pressure exerted by the other of said elements.

7. The combination with a planetary driven member, of means for applying a load at the axis of said member, a pair of concentric rotating power-transmitting elements engaging opposite sides of said member, the points of engagement between the respective elements and the said member varying predeterminedly with respect to the axis of said elements, a planetary driving member also operatively engaged at opposite sides by said elements, means for adjusting said driving member with respect to the elements so that the distance of the points of contact between said member and the respective elements may correspond with the points of contact between said elements and the driven member whereby the pressures applied by said elements upon the opposite sides of the driven member may be equalized, said adjustment means also providing for a relative change of the points of contact of the driving member and said elements effecting an inequality in the torques applied to the driven member by the said elements, and means for preventing a reverse movement of that one of the elements through which the lesser torque is transmitted whereby the said element may constitute a fulcrum about which the driven member is movable under driving force applied through the other of said elements.

8. The combination with planetary driving and driven members, of a pair of power-transmitting elements concentrically rotatable and respectively engaging opposite sides of said members, the point where the driven member engages one of the elements being at a greater distance radially from the axis of said elements than the point where the said member engages the other of the elements, the driving member being adjustable and adapted in one adjusted position to correspond with the first-named member as regards the relative positions of the points of contact with said elements, and means for adjusting said driving member to modify the relative positions of the points of contact with the said elements whereby the effective torques applied through the said elements to the driven member differ predeterminedly in magnitude, and means for preventing a reverse rotation of the element transmitting the lesser torque.

9. The combination with planetary driving and driven members, of a pair of power-transmitting elements concentrically rotatable and respectively engaging opposite sides of said members, the radial distance of the point of contact of the driven member with one of said elements being greater than the radial distance of the point of contact of said member with the other of said elements and the driving member being adjustable between alternative terminal positions in one of which the positions of its points of contact with the said elements correspond in radial distances from the axis of rotation of the elements with the points of contact between the driven member and said elements respectively, and in the other of which the relative positions of the points of contact of the driving member and the elements are reversed, said driving member in the first of said alternative positions exerting equal torques upon the first-named member through the said elements whereby the said members and the elements tend to rotate as a unit without relative movement, and said member in the other of said alternative positions exerting unequal torques upon the driven member, and means for preventing a reverse rotation of that one of the power-transmitting elements transmitting the lesser torque.

10. The combination with a pair of concentric rotatable elements, of a pair of planetary members interposed between and each engaged on opposite sides by said elements, the radial distance between the point of contact of the first of said members with one of said elements being greater than the radial distance of the point of contact of said member with the other of said elements, and the second of said members being adjustable between alternative positions, in one of which the points of contact thereof with the said elements correspond in radial distance from the axis of rotation of the elements with the points of contact of the first-named member and elements respectively, and in the other of which the relative position of the points of contact of said second member and the elements is reversed, the first of said alternative positions affording a substantial equalization of the torques transferred through said transmitting elements from one of said members to the other, and the other of said alternative positions affording a predetermined difference between said transmitted torques, means for preventing a reverse rotation of that one of the elements through which the lesser torque is transmitted, and means for connecting the said second member with a source of power.

11. The combination with a pair of concentric radially spaced elements, of a third coaxial rotary element having a planetary element interposed between and operatively engaged by both of said elements, a fourth coaxial element also carrying a planetary member interposed between said rotary elements, said last-named member being adjustable to predeterminedly vary with respect to each other the distances of the points of contact between said member and the said elements from the rotary axis of the latter, said elements being rotatable together in one direction, means for preventing a reverse rotation of the outer of said rotary elements, and means for connecting said fourth coaxial element with a source of power.

12. The combination with a pair of concentric rotatable and radially spaced elements, of a planetary member confined between said elements, a second planetary member also confined between said elements and adjustable to vary the relative distances from the axis of rotation of said elements and the points of contact between the said elements and said member, said elements being adapted for rotation together in one direction under impulse applied through one of said planetary members, means for preventing a rotation in the reverse direction of one of said elements, and means for connecting said second planetary member to a source of power.

13. In a transmission device, the combination with a rotary housing, and means permitting rotation of the housing in one direction only, of a shaft extending concentrically into said housing, a planetary friction wheel carried by said shaft, a second shaft concentrically journaled in the housing, said second shaft having a member forming with a part of the housing a toroidal space concentric with the housing within which the said planetary wheel operates in frictional association with the housing and with said second shaft, means for adjusting said planetary wheel to relatively vary the distances of the points of contact between the wheel and the housing and between the wheel and said second shaft member from the common axis of rotation of said elements, a pinion carried by said second shaft, a ring gear secured in the housing surrounding said pinion and concentric therewith, a planetary pinion interposed between said first-named pinion and the ring gear, and a shaft concentric with the housing and operatively connected with said planetary pinion.

14. In a transmission mechanism, the combinaton with a casing, and means for rotatably mounting said casing, of means for preventing rotation of the casing in one direction, a shaft extending concentrically into said casing at one end, a planetary friction wheel carried by said shaft, a second shaft journaled concentrically in the casing, said shaft having a member thereon forming with a part of the casing a toroidal space concentric with the casing in which said friction wheel operates, said wheel being adjustable to relatively vary the distances of the points of contact of said wheel with the casing and with said second shaft member, respectively, a pinion carried by said second shaft, a ring gear concentrically secured to the housing, and a planetary pinion operative between said first-named pinion and the ring gear, a third shaft extending concentrically into the opposite end of said casing, and a crank arm on said third shaft to which the planetary pinion is connected, the lines of contact between the planetary pinion and said ring gear and sun pinon, respectively, corresponding with the radial distances from the axis of the casing of the extreme points of contact between the planetary friction wheel and the second shaft member and casing.

15. In a transmission mechanism, the combination with a casing, and means for rotatably mounting said casing, of a shaft extending concentrically into one end of said casing, a second shaft extending concentrically into the opposite end of said casing, a planetary element carried by each of said shafts, an intermediate shaft, and elements movable with the casing and with said intermediate shaft, respectively, and operatively engaging the opposite sides of said planetary elements, at least one of said planetary elements being adjustable to relatively vary the distances from the axis of said casing of the points of contact between said element and the casing and intermediate shaft respectively, and means for preventing rotation of the housing in one direction.

16. In a transmission mechanism, the combination with a housing, and means for rotatably mounting said housing, of a shaft extending concentrically into one end of said housing, a second shaft extending concentrically into the opposite end of said housing, a planetary element carried by each of said shafts, an intermediate shaft, and elements movable with the housing and with the intermediate shaft, respectively, and operatively engaging opposite sides of both of the said planetary elements, the radial distances from the axis of the casing of the points of contact between one of said planetary elements and the said oppositely engaging elements being the same as the radial distances from the said axis of the points of contact between the other of said elements and the said oppositely engaging parts, and means for adjusting at least one of said planetary elements to relatively vary the distances from the said axis of rotation of the points of contact between said element and the oppositely engaged parts, and means permitting rotation of the housing in one direction only.

17. In a transmission device, the combination with a housing, of means for rotatably mounting said housing, and means for preventing rotation of said housing in one direction, of a pair of shafts projecting concentrically into opposite ends of said housing, a planetary element carried by each of said shafts, an intermediate shaft, and elements movable with the housing and with said intermediate shaft, respectively, for operatively engaging opposite sides of said planetary elements and means for adjusting at least one of said planetary elements to relatively vary the distances from the axis of rotation of the casing of the points of contact between said element and the respective oppositely engaging parts, said adjusting means comprising an element extending axially through the associated shaft, and means for operatively connecting said element with the planetary wheel.

18. The combination with a planetary driven member, of means for applying a load to said member, a pair of power-transmitting elements engaging said driven member, a planetary driving member engaging said elements and adapted therethrough to exert pressures upon the driven member tending to move the latter against the said load, means for relatively adjusting the driving member and said elements to vary the moments of the forces exerted by said elements upon the driven member, said means affording an equalization of the pressures with respect to the load whereby the said members and elements tend to move as a unit against the load, and affording also an unbalance of said pressures whereby the effective pressure exerted through one of said elements is greater than that exerted through the other, and means for preventing reverse movement of that one of the elements through which the lesser pressure is exerted whereby said element may constitute a fulcrum on which the driven member is movable under pressure exerted through the other of said elements.

19. The combination with a planetary driven member, of means for applying a load to said member, a pair of co-axial rotary transmission elements engaging said planetary member respectively at points differing as to radial distance from the orbital axis of said member and at opposite sides of the load, a planetary driving member engaging both of said elements, means for relatively adjusting said driving member and said elements to vary the relative distances of the points of contact between the driving member and said elements radially with respect to the common axis of the latter, said driving member tending to rotate said elements simultaneously in one direction, and means for preventing rotation in the opposite direction of that one of the elements engaging the driven member at the point furthest from the orbital axis of the latter.

20. The combination with a planetary driven member, of means for applying a load to said member, a pair of coaxial rotary transmission elements having positive driving connections with said driven member respectively at points differing as to radial distance from the orbital axis of said member and at opposite sides of the load, a planetary driving member frictionally engaging both of said elements and tending to rotate said elements simultaneously in one direction, means for preventing rotation in the opposite direction of that one of said elements engaging the driven member furthest from the orbital axis of the latter, and means for adjusting the driving member with respect to said elements to vary relatively the radial distances from the axis of rotation of said elements of the respective points of contact of said driving member with said elements.

21. The combination with a planetary driven member, of means for applying a load to said member, a pair of coaxial rotary elements engaging said driven member at opposite sides of the load respectively, the point of engagement of one of said elements with the driven member being radially further from the common axis of said elements than the point of engagement with said driven member of the other element, a planetary driving member engaging both of said elements and tending to rotate the said elements simultaneously in one direction, means for preventing rotation in the opposite direction of that one of said elements which engages the driven member furthest from the axis of said elements, and means for adjusting said driving member to relatively vary the distances from the axis of said elements of the respective points of contact of said driving member with said elements.

22. The combination with a driven member, of means for applying a load to said member, a pair of coaxial rotary transmission elements having positive driving connections with said member respectively at points differing as to radial distance from the common axis of rotation of said elements, a planetary driving member frictionally engaging both of said elements and tending to rotate said elements simultaneously in one direction, means for preventing rotation in the opposite direction of that one of the elements engaging the driven member at the point further from the axis of said elements, and means for adjusting said driving member to relatively vary the radial distance from the axis of said elements of the points of contact with said elements of the driving member.

23. The combination with a planetary driven member, of means for applying a load to said member, a pair of coaxial rotary transmission elements engaging said planetary member respectively at opposite sides of the load, a planetary driving member engaging both of said elements and tending to rotate said elements simultaneously in the same direction, means for adjusting said driving member with respect to said elements to vary the relative distances of the points of contact between the driving member and said elements radially with respect to the common axis of the latter to thereby vary the torques exerted by said elements upon the driven member between a predetermined differential and unity, and means for preventing a reverse movement of that element through which the lesser torque is transmitted.

24. The combination with a planetary driven member, of means for applying a load to said member, a pair of coaxial rotary transmission elements engaging said planetary member respectively at points at opposite sides of the load, a planetary driving member engaging both of said elements and tending to rotate said elements simultaneously in one direction, means for adjusting said driving member with respect to said elements to vary the relative distances of the points of contact between the driving member and said elements radially with respect to the common axis of the latter to thereby relatively vary the torques exerted by said elements upon the driven member, and means for preventing a reverse movement of that one of said elements through which the lesser torque is transmitted.

25. The combination with a planetary driven member, of means for applying a load to said member, a pair of coaxial rotary transmission elements having positive driving connections with said driven member respectively at points at opposite sides of the load, a planetary driving member frictionally engaging both of said elements and tending to rotate said elements simultaneously in one direction, means for adjusting the driving member with respect to said elements to vary relatively the radial distances from the axis of rotation of said elements of the respective points of contact of said driving member with the elements to thereby relatively vary the torques exerted by said elements upon the driven member, and means for preventing a reverse movement of that one of said elements through which the lesser torque is transmitted.

26. The combination with a planetary driven member, of means for applying a load to said member, a pair of coaxial rotary transmission elements engaging said planetary member respectively at points at opposite sides of the load, a planetary driving member engaging both of said elements and tending to simultaneously rotate said elements in one direction, means for adjusting said driving member with respect to said elements to vary the relative distances of the points of contact between the driving member and said elements radially with respect to the common axis of the latter to and from a point where the ratio of said distances corresponds to the ratio of the corresponding distances from said axis of the points of contact between the driven member and said elements to thereby vary the torques exerted by said elements upon the driven member between a predetermined unbalance and an effective balance with respect to said load, and means for preventing a reverse movement of that one of said elements through which the lesser torque is transmitted.

27. The combination with a planetary driven member, of means for applying a load to said member, a pair of coaxial rotary transmission elements having positive driving engagement with said planetary member respectively at points at opposite sides of the load, a planetary driving member engaging both of said elements and tending to simultaneously rotate said elements in one direction, means for adjusting said driving member with respect to said elements to vary the relative distances of the points of contact between the driving member and said elements radially with respect to the common axis of the latter to and from a point where the ratio of said distances corresponds to the ratio of the corresponding distances from said axis of the points of contact between the driven member and said elements to thereby vary the torques exerted by said elements upon the driven member between a predetermined unbalance and an effective balance with respect to said load, and means for preventing a reverse movement of that one of said elements through which the lesser torque is transmitted.

28. The combination with rotary driving and driven members, of an intermediate rotary transmission member and a rotary reaction member, means including a planetary element operatively engaging the intermediate and reaction members, for operatively connecting said members with the driving member, means for adjusting said element to relatively vary the torques imposed by said planetary element upon the reaction and intermediate members, a toothed gear carried by said intermediate member, a toothed gear carried by said reaction member, a pinion meshing with both of said gears and carried by said driven member, and means for preventing rotation of the reaction member in a direction opposite to the rotary movement of the driving member.

29. The combination with rotary driving and driven members, of an intermediate rotary transmission member and a rotary reaction member, a planetary roller element carried by the driving member and operatively engaging surfaces of both the intermediate and reaction members, means for adjusting said planetary roller to relatively vary the torques imposed thereby upon the intermediate and reaction members, a pinion carried by the intermediate member, an annular gear carried by said reaction member, a planetary gear meshing with both the pinion and the annular gear and carried by said driven member, and means for preventing rotation of the reaction member in a direction opposite to the direction of rotation of said driving member.

30. The combination with rotary driving and driven members, of an intermediate rotary transmission member and a reaction member, said members having a common axis of rotation, and said reaction and intermediate members being formed with oppositely arranged annular recesses defining a toroidal space concentric with the axis of said members, a planetary roller carried by the driving member and engaging the intermediate and reaction members within said toroidal space, said planetary roller being adjustable to relatively vary the distance from the said axis of the points of contact thereof with the intermediate and reaction members respectively, a pinion carried by said intermediate member, an annular gear carried by said reaction member and embracing said pinion, a planetary gear meshing with and operating between the said pinion and the annular gear and carried by the driven member, and means for preventing rotation of the reaction member in a direction opposite to the direction of rotation of the driving member.

31. The combination with planetary driving and driven members, of a pair of power-transmitting elements concentrically rotatable and respectively engaging opposite sides of said members, one of said members being in the form of a toothed gear, and said power-transmitting elements comprising sun and orbit gears meshing therewith, and the other of said members being in the form of a roller, and said power-transmitting elements comprising opposite annular and coaxial recesses defining a toroidal space within which said roller operates, means for adjusting said roller from a position in which its points of contact with said elements correspond in radial distances and respectively with the pitch circles of the sun and orbit gears respectively into a position in which the relative positions of said points of contact are reversed, and means for preventing rotation of that one of said power-transmitting elements which carries the orbit gear in a direction opposite to the direction of movement of the planetary members in their orbital paths.

32. The combination with planetary driving and driven members, of a pair of power-transmitting elements concentrically rotatable and respectively engaging opposite sides of said members, one of said members being in the form of a toothed gear, and said power-transmitting elements comprising respectively sun and orbit gears meshing therewith, and the other of said members being in the form of a roller, and said power-transmitting elements comprising opposite annular and coaxial recesses defining a toroidal space within which said roller operates, means for adjusting said roller from a position in which its points of contact with said elements correspond in radial distances and respectively with the pitch circles of the sun and orbit gears into a position in which the relative positions of said points of contact are reversed, and means for preventing rotation of that one of said power-transmitting elements which carries the orbit gear in a direction opposite to the direction of movement of the planetary members in their orbital paths, said roller and planetary gear constituting respectively the driving and driven members.

33. The combination with a planetary driven member, of a pair of coaxial rotary elements engaging opposite sides of said planetary member and adapted for rotation with the latter as a unit in one direction, means for exerting a driving torque of predetermined magnitude upon said member through one of said elements and a lesser driving torque upon said member through the other of said elements, means for preventing rotation of the last-named element in a reverse direction and planetary rolling-adhesion means for progressively decreasing and increasing said driving torques respectively to a condition of substantial balance wherein the said elements and member tend to rotate as a unit in the same direction.

34. The combination with a planetary driven member, of a pair of coaxial rotary elements engaging opposite sides of said planetary member, a planetary driving member operative through one of said elements to exert a driving torque of predetermined magnitude upon said driven member and a lesser driving torque upon said driven member through the other of said elements, means for preventing rotation of the last-named element in a reverse direction, and means operatively associated with the driving member for progressively decreasing and increasing said driving torques respectively to a condition of substantial balance wherein the said elements and the driven member tend to rotate as a unit in the same direction.

35. The combination with planetary driving and driven members, of a pair of rotary elements respectively engaging opposite sides of both of said members and adapted for rotation with the latter as a unit in one direction, means for exerting a driving torque of predetermined magnitude upon the driven member through one of said elements and a lesser driving torque upon said member through the other of said elements, means for preventing rotation of the last-named element in a reverse direction, and rolling-adhesion means operatively associated with said driving member for progressively decreasing and increasing said driving torques respectively to a condition of substantial balance wherein the said elements and members tend to rotate as a unit in the same direction.

36. A transmission comprising interconnected planetary mechanisms, one of said mechanisms being of the geared or positive type and another being of the rolling adhesion or friction type; a driven element connected to the first-named of said planetary mechanisms; a driving element connected to the planetary member of the second-named planetary mechanisms; and means for adjusting said planetary member to vary the torque ratio of the driving and driven elements.

37. A transmission comprising interconnected planetary systems mounted for joint rotation as a unit with the elements of each system in relatively fixed relation, one of said systems being of the geared or positive type and the other being of the rolling adhesion or friction type; a driven member connected to the first-named system; a driving member connected to the planetary element of the second-named system; means for relatively adjusting said planetary element in its system to vary the torque ratio of the driving and driven members, said planetary element in a given adjusted position effecting a balance of forces tending to rotate the systems in said unitary relation; and means for controlling the movement of an element of each of said systems for transmission of power between the driving and driven members when said planetary element is in another position of adjustment.

38. A transmission comprising a planetary system of the rolling adhesion or friction type in which the planetary element is relatively adjustable to vary the ratio of torque input and output, said system being mounted for rotation as a unit with the elements of the system in relatively fixed relation; a positive gear system also mounted for rotation as a unit and connected with the said planetary system for unitary interlocked rotation with said system when the planetary element of the latter is in a given position of adjustment; means for controlling the movement of an element of each system for transmission of power when the planetary element is in another position of adjustment; means for connecting a driving member with said planetary element; means for connecting a driven member to the positive gear system; and means for relatively adjusting the planetary element to vary the torque ratio of said driving and driven members.

39. The combination with a planetary driven member, of means for applying a load to said member; a pair of coaxial rotary transmission elements operatively connected with said planetary member; a planetary driving member associated with both of said elements, and means for relatively adjusting said driving member and said elements to relatively vary the forces exerted on said driven member by the said elements, said driving member in different positions of adjustment affording a balance of said forces with respect to the load and varying conditions of unbalance; and means for preventing rotation of that one of the transmission elements exerting the force of lesser effectiveness with respect to the load in a direction reverse to that in which the impulse is applied thereto by the driving member.

40. The combination with a planetary driven member, of means for applying a load to said member; a pair of coaxial rotary transmission elements operative on said planetary member respectively at points differing as to radial distance from the orbital axis of said member; a planetary driving member engaging both of said elements; means for relatively adjusting said driving member and said elements to vary the relative distances of the points of contact between the driving member and said elements radially with respect to the common axis of the latter, said driving member tending to rotate said elements simultaneously in one direction; and means for preventing rotation in the opposite direction of that one of the elements through which is transmitted to the driven member the force of lesser magnitude with respect to the load.

41. A transmission mechanism comprising driving and driven elements, and planetary mechanisms operatively associated respectively with said elements and with each other and jointly constituting a reduction gearing connecting said elements, that one of said mechanisms associated with the driven element being of the geared or positive type, and the planetary mechanism associated with the driving element being of the rolling adhesion or friction type; means for connecting the planetary element of the last-named mechanism with the driving element whereby the driving power is applied to the transmission through said planetary element; and means for relatively adjusting said planetary element to vary the torque ratio of the driving and driven elements.

42. A transmission mechanism comprising driving and driven elements, and planetary mechanisms operatively associated respectively with said elements and with each other and jointly constituting a reduction gearing connecting said elements, that one of said mechanisms associated with the driven element being of the geared or positive type, and the planetary mechanism associated with the driving element being of the rolling adhesion or friction type and being adjustable to effect a variation in said connection between a predetermined reduction ratio and unity; and means for connecting the planetary element of the last-named mechanism with the driving element whereby the power is applied to said transmission through said planetary element.

43. A transmission mechanism comprising driving and driven elements, and planetary mechanisms operatively associated respectively with said elements and with each other and jointly constituting a reduction gearing connecting said elements, that one of said mechanisms associated with the driven element being of the geared or positive type, and the planetary mechanism associated with the driving element being of the rolling adhesion or friction type and being adjustable to vary the speed and torque ratios of said driving and driven elements between predetermined maximums and unity, said planetary element of the last-named mechanism being connected with the driving element whereby the power applied to said transmission enters through said planetary element.

44. A transmission mechanism comprising driving and driven elements, and planetary mechanisms operatively associated respectively with said elements and with each other and jointly constituting a reduction gearing connecting said elements, that one of said mechanisms associated with the driven element being of the geared or positive type, and the planetary mechanism associated with the driving element being of the rolling adhesion or friction type and being adjustable to vary the speed and torque ratios of the driving and driven elements, said mechanisms and elements being mounted for rotation as a unit when the speed ratio of said elements is unity; and means for connecting the planetary element of the said rolling adhesion or friction mechanism with the driving element whereby the power is applied to the transmission through said planetary element.

45. A transmission mechanism comprising driving and driven planetary mechanisms operatively associated with each other to form a series reduction gear train, said mechanisms being mounted for rotation as a unit, the driven mechanism being of the geared or positive type, and the driving mechanism being of the rolling adhesion or friction type and being adjustable to vary the speed and torque ratios of the terminal elements of said train between a predetermined maximum and unity; means for controlling the rotation of one of the elements of each mechanism; and means for connecting the planetary element of the driving mechanism with a source of power whereby said planetary element constitutes the driving element of said transmission.

46. A transmission mechanism comprising a pair of planetary mechanisms, two of the elements of each mechanism being common to the other, and said mechanisms being mounted for joint rotation as a unit, one of said common elements being normally prevented from rotation in one direction and constituting a fulcrum upon which the other elements of the mechanism may operate, and the other of said common elements constituting a transmission link between the terminal driving and driven elements of the joint mechanism, that one of the planetary mechanisms with which the driven terminal element is associated being of the geared or positive type, and the other of said planetary mechanisms being of the rolling adhesion or friction type; means for adjusting said latter mechanism to vary the relative impulses exerted in said planetary mechanisms upon the said common elements between a predetermined condition of unbalance and a condition of substantial balance wherein the entire mechanism tends to rotate as a unit; and means for connecting the planetary element of the rolling adhesion or friction mechanism with a source of power whereby said planetary element constitutes the driving terminal element of the transmission.

JOHN S. SHARPE.